(12) United States Patent
Goel

(10) Patent No.: US 10,425,504 B1
(45) Date of Patent: *Sep. 24, 2019

(54) SECURING INTERNAL SERVICES IN A DISTRIBUTED ENVIRONMENT

(71) Applicant: Veritas Technologies LLC, Mountain View, CA (US)

(72) Inventor: Vikas Goel, Sunnyvale, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,519

(22) Filed: Mar. 5, 2018

Related U.S. Application Data

(63) Continuation of application No. 15/010,487, filed on Jan. 29, 2016, now Pat. No. 9,912,783.

(51) Int. Cl.
| *H04L 29/06* | (2006.01) |
| *H04L 29/08* | (2006.01) |
| *G06F 21/54* | (2013.01) |
| *G06F 21/62* | (2013.01) |

(52) U.S. Cl.
CPC .......... *H04L 67/42* (2013.01); *G06F 21/54* (2013.01); *G06F 21/629* (2013.01); *H04L 63/0227* (2013.01); *H04L 67/32* (2013.01)

(58) Field of Classification Search
USPC ................... 709/203, 219, 224, 218, 227
See application file for complete search history.

(56) References Cited

U.S. PATENT DOCUMENTS

| 7,610,384 | B1 * | 10/2009 | Schulzrinne ...... H04L 29/08072 379/38 |
| 8,825,035 | B2 | 9/2014 | Moton, Jr. et al. |
| 8,929,257 | B1 * | 1/2015 | Goepp ............... H04L 65/1076 370/260 |
| 9,258,742 | B1 | 2/2016 | Pianigiani et al. |
| 9,912,783 | B2 * | 3/2018 | Goel ...................... H04L 67/32 |
| 9,928,107 | B1 * | 3/2018 | Vincent ................ G06F 9/4856 |
| 2003/0208533 | A1 | 11/2003 | Farquharson et al. |
| 2004/0086094 | A1 * | 5/2004 | Bosik ................ H04M 3/42093 379/88.12 |
| 2004/0090992 | A1 * | 5/2004 | Lee ....................... H04W 28/22 370/493 |
| 2004/0199763 | A1 | 10/2004 | Freund |
| 2005/0050026 | A1 | 3/2005 | Kawamura et al. |

(Continued)

FOREIGN PATENT DOCUMENTS

| EP | 2911084 A2 | 8/2015 |
| WO | 2017132440 A1 | 8/2017 |

*Primary Examiner* — Jude Jean Gilles
(74) *Attorney, Agent, or Firm* — Campbell Stephenson LLP

(57) ABSTRACT

Disclosed herein are methods, systems, and processes to secure internal services in a distributed computing environment. A service packet that includes a service call from a source appliance is intercepted at a server. A determination is made that the service call is for an internal service provided by the source appliance and includes client information with client process properties. The service packet is demultiplexed. A determination is made that rule attributes associated with the internal service match the client process properties. The client information is removed from the service packet and the service call is forwarded to the server.

20 Claims, 9 Drawing Sheets

(56) References Cited

U.S. PATENT DOCUMENTS

| | | | |
|---|---|---|---|
| 2005/0050084 A1* | 3/2005 | Atm | G06F 9/44505 |
| 2005/0068204 A1* | 3/2005 | Jeon | H04N 7/52 |
| | | | 341/50 |
| 2005/0182966 A1 | 8/2005 | Pham et al. | |
| 2006/0023702 A1* | 2/2006 | Pulitzer | G06F 3/005 |
| | | | 370/352 |
| 2006/0123053 A1* | 6/2006 | Scannell, Jr. | G06F 17/30035 |
| 2007/0016914 A1 | 1/2007 | Yeap | |
| 2008/0126762 A1 | 5/2008 | Kelley et al. | |
| 2009/0007242 A1 | 1/2009 | Subramanian et al. | |
| 2010/0217837 A1* | 8/2010 | Ansari | G06Q 30/04 |
| | | | 709/218 |
| 2015/0074259 A1* | 3/2015 | Ansari | H04L 67/02 |
| | | | 709/224 |
| 2015/0103136 A1* | 4/2015 | Anderson | H04L 12/18 |
| | | | 348/14.09 |
| 2015/0106629 A1* | 4/2015 | Anderson | H04N 7/152 |
| | | | 713/189 |
| 2015/0271205 A1 | 9/2015 | Duminuco et al. | |
| 2015/0347683 A1* | 12/2015 | Ansari | H04L 63/08 |
| | | | 726/7 |
| 2016/0028891 A1 | 1/2016 | Pirat et al. | |
| 2016/0302265 A1* | 10/2016 | Kreiner | H05B 6/666 |
| 2016/0371484 A1 | 12/2016 | Mehta et al. | |

\* cited by examiner

SECURING INTERNAL SERVICES IN A DISTRIBUTED ENVIRONMENT

CROSS-REFERENCE TO RELATED APPLICATIONS

The present patent application is a continuation of U.S. patent application Ser. No. 15/010,487, filed on Jan. 29, 2016, entitled "SECURING INTERNAL SERVICES IN A DISTRIBUTED ENVIRONMENT" which is incorporated by reference herein in its entirety and for all purposes.

FIELD OF THE DISCLOSURE

The present disclosure relates to data protection systems and, more particularly, to systems, methods, and processes to secure internal services in a distributed environment.

DESCRIPTION OF THE RELATED ART

Businesses use appliances to provide business services to customers. Appliances can be hardware devices with integrated software (e.g., firmware), designed to provide one or more business services. Appliances can also be virtual appliances. Virtual appliances are pre-configured virtual machine images and can be created by installing software appliances on virtual machines. Unlike general purpose computers, appliances are not designed to allow users to change the software (including the underlying operating system).

Appliances can also be configured with hardware and/or software to enable them to function as clients and/or servers. An end user of these clients and/or servers need not understand the technical details of the underlying operating system running on the appliances because the hardware and/or software is preconfigured (e.g., by a manufacturer) and unmodifiable. In this manner, appliances are designed to be secure black boxes for the end user (e.g., a customer).

A cluster is a set of computing systems that are communicatively coupled to each other via a network (e.g., the Internet, and the like). Appliances can be deployed as discrete and separate computing systems in a cluster. For example, a first appliance hosting a client may request one or more internal services from a server hosted by a second appliance in the cluster.

The business service(s) provided by the first appliance often depend on these one or more internal services provided by the second appliance (e.g., a database server, and the like). These internal services are critical for the functioning of various appliances in the cluster and thus, must be protected from malicious attacks and/or security vulnerabilities.

SUMMARY OF THE DISCLOSURE

Disclosed herein are methods, systems, and processes to secure internal services in a distributed environment. One such method involves intercepting a service call initiated by a client process of a client. In this example, the service call is a request for an internal service provided by a server. The client is deployed in a source appliance and the server is deployed in a target appliance. The service call includes an identifier and the identifier identifies the internal service. The method determines whether one or more rules of a plurality of rules are specified for the identifier. In response to the determination that one or more rules are specified, the method generates a service packet by multiplexing client information associated with the client process, and information in the service call, and forwards the service packet to the target appliance.

In one embodiment, the method accesses source kernel memory of the source appliance and retrieves the client information from source kernel memory. The client information includes one or more client process properties associated with the client process. In another embodiment, the method intercepts the forwarded service packet and demultiplexes the service packet to retrieve the client information. The method then processes one or more attributes of at least one rule using the client information and forwards the service call to the server, if the processing indicates that the forwarding the service call is allowable. The client process properties include but are not limited to a user context, a user group context, a client program name, a parent process name, and/or a terminal type.

In one embodiment, each rule of the one or more rules includes one or more (unique) attributes, and each attribute of one or more attributes corresponds to a client process property. In this example, the one or more rules are part of a rule set. The rule set is part of a source service call filter module as well as a target service call filter module. Source kernel includes a multiplexing module that performs the multiplexing, and target kernel includes a demultiplexing module that performs the demultiplexing.

In some embodiments, the method forwards the service call to the server if no rule is specified for the identifier. The processing includes determining whether each attribute of at least one rule matches a corresponding client process property.

In certain embodiments, the method accesses the rule set to determine whether the internal service identified by the identifier is unprotected or protected. In this example, the internal service is protected if the rule set includes at least one rule for the identifier specified in the service call, and the internal service is unprotected if the rule set includes no rules for the identifier specified in the service call.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art, by referencing the accompanying drawings.

Figure 1:
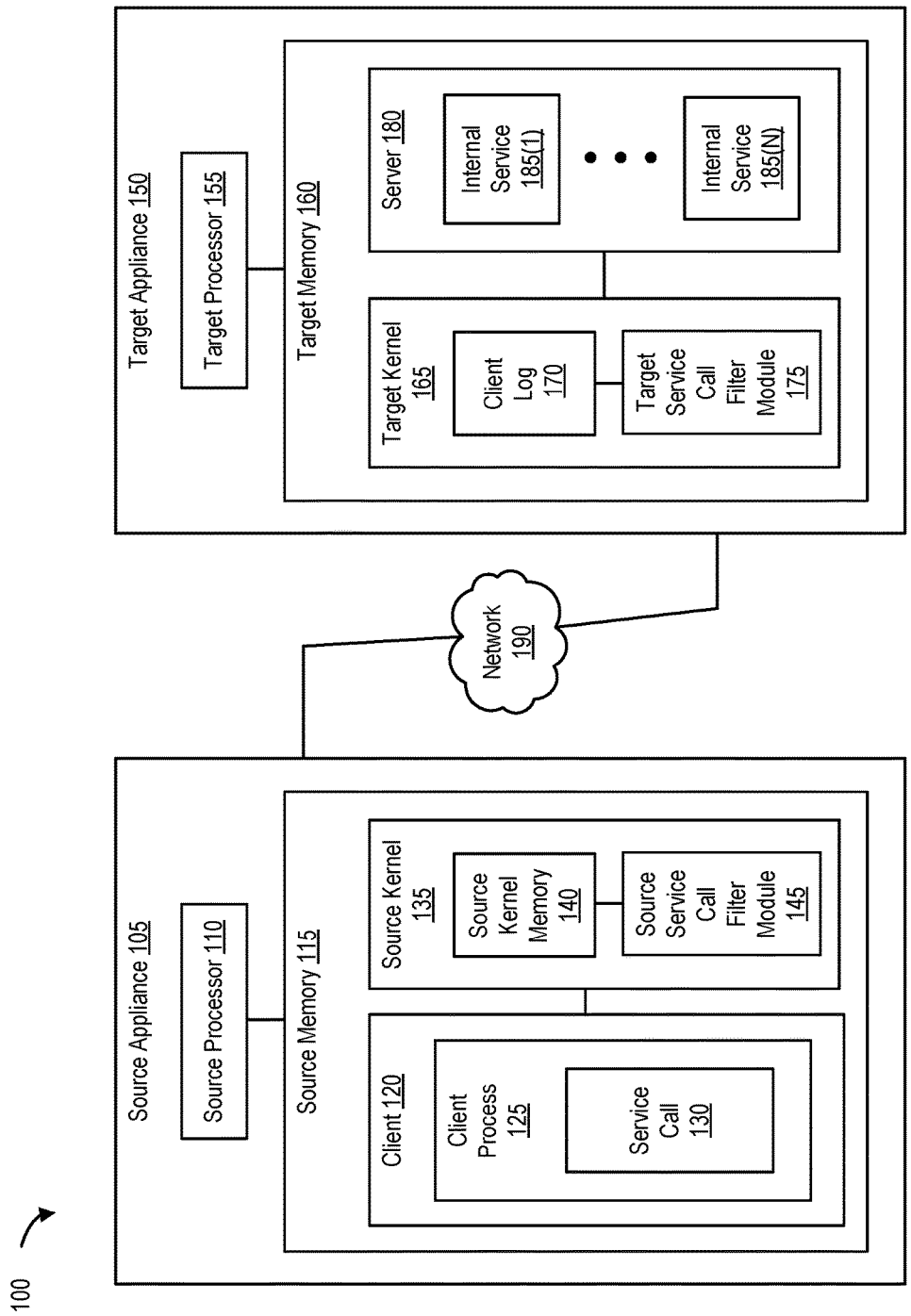
FIG. 1 is a block diagram of a distributed computing environment, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Appliances are discrete hardware devices with integrated software (e.g., firmware), specifically designed to provide a specific computing resource (e.g., access to one or more business services). Appliances can also be virtual appliances. Virtual appliances are configured to provide similar functionality as dedicated hardware appliances, but virtual appliances are distributed (e.g., to customers), as software virtual machine images in a hypervisor, or for a hypervisor-enabled device. In addition, customers can deploy appliances by integrating the software (e.g., operating system (OS) software) and the hardware of a computing device.

Appliance have exactly one combination of hardware, operating system, and application software (e.g., application software that is required to provide business services). Therefore, appliances can be deployed and managed by customers without extensive Information Technology (IT) knowledge. Once deployed however, appliances do not permit (and are not designed to allow) customers to change (or modify) the software (e.g., OS software). Therefore, appliances are designed to be secure black boxes for customers.

Businesses use appliances to provide business services to customers. Software (e.g., application software and OS software in the appliance) that is configured provide these one or more business services (e.g., online banking, electronic commerce, and the like) requires one or more internal services for operation. For example, appliances can be configured to host a server that provides internal services such as database and/or web services required by the application software that provides online banking services.

Internal services are computing services (e.g., web services provided by a web server, database services provided by a database server, a message queue server, and the like) that are only provided to the software (e.g., application software and/or OS software) or the hardware of an appliance. Therefore, internal services provided by standalone appliances are not generally exposed to (and are not accessible by) users or other computing devices (e.g., external clients).

However, as previously noted, appliances can be deployed in a distributed computing environment (also called appliance ecosystem). For example, two or more appliances can be deployed in a cluster, a cloud, or in any multi-node computing environment to each perform different computing tasks and to provide various computing service(s). In such a distributed computing environment, appliances communicate with each other (e.g., via a network) to provide computing services to each other.

Deploying two or more appliances in such an appliance ecosystem exposes an appliance that provides internal services to other appliances in the appliance ecosystem (e.g., other appliances within same network, cloud, cluster, and the like). Therefore, unlike a standalone appliance, in a multi-node computing environment, an appliance that provides internal services is prone to security attacks from external clients too (e.g., from client programs that execute on a different appliance than the appliance that provides the internal services).

For example, a user with access to one appliance (any appliance/machine in the same network) can use a local client program (or even develop a custom client program) to initiate a connection request (or a service call) from that client program to another appliance that provides internal services to: (1) initiate a brute force attack (e.g., to gain sensitive information accessible to an internal service), (2) exploit security vulnerabilities of the internal service (e.g., by gaining root privilege using a reverse shell command), (3) initiate a Denial of Service (DoS) attack, and/or (4) initiate one or more of various other malicious attacks.

A firewall may be useful to secure appliances in a distributed computing environment (also called appliance ecosystem) from external threats and attacks (e.g., from computing systems and/or devices that operate outside the network, cloud, cluster, and the like). However, a firewall cannot prevent a first appliance (or any other system in the same network) from accessing and attacking internal services that are running on a second appliance, where both the first appliance and the second appliance are part of the same appliance ecosystem (e.g., part of the same network, cloud, cluster, and the like). In addition, because the software executing on an appliance cannot be modified by the customer and/or user, modifying the internal service to secure the internal service from external clients in the appliance ecosystem is not feasible.

Therefore, the above-mentioned security concerns are exacerbated if the client requesting an internal service and the server that provides the internal service are deployed on two separate appliances in a given appliance ecosystem. In this scenario, the internal service is exposed to external clients outside the appliance on which the internal service is executing (e.g., to other nodes, via the network). Although a firewall can define the boundary of the network (e.g., limit network communication between certain nodes in that network), the firewall cannot prevent one node that is part of the network from accessing and attacking (e.g., via a client program) internal services running on another node that is also part of the same network (or cloud, cluster, and the like).

Disclosed herein are methods, systems, and processes to secure internal services in a distributed environment and/or appliance ecosystem by only permitting connection/service requests (e.g, connect calls, service calls, and the like) for internal services from certain clients (e.g., client programs and/or client processes such as web services, internal scripts, maintenance and support users, and the like, that are required for the functioning of the appliance or appliance ecosystem) without modifying the internal services themselves.

It should be noted that the present application is related to the subject matter of application entitled "Securing Internal Services In An Appliance," filed on the same day as the present application and having the same inventor and assignee, which is incorporated herein by reference, in its entirety and for all purposes.

Examples of an Appliance Ecosystem

FIG. 1 is a block diagram of an appliance ecosystem, according to one embodiment. The appliance ecosystem includes a source appliance 105 and a target appliance 150 communicatively coupled to each other via network 190. Source appliance 105 and target appliance 150 can be any of a variety of different computing devices, including a server, personal computing device, laptop computer, cellular phone, or the like.

Source appliance 105 and target appliance 150 can also execute or deploy any number of a variety of different software programs (e.g., a client program, a server program, and the like) on one or more virtual machines. Network 190 can be any type of network and/or interconnection (e.g., the Internet, a Wide Area Network (WAN), and the like).

Source appliance 105 includes a source processor 110 and a source memory 115. Source memory 115 implements a source operating system (OS) (not shown). Source OS executes a client 120 and includes a source kernel 135. Client 120 is a software program that is deployed on source appliance 105. Client 120 initiates a client process 125. Client process 125 requests access to an internal service using a service call 130. Source kernel 135 includes a source kernel memory 140 and a source service call filter module 145.

Target appliance 150 includes a target processor 155 and a target memory 160. Target memory 160 implements a target OS (not shown). Target OS executes a server 180 and includes a target kernel 165. Server 180 is a software program that is deployed on target appliance 150. Server 180 provides internal services 185(1)-(N) to one or more appliances (e.g., to source appliance 105 or another appliance on network 190). Target kernel 165 includes a client log 170 and a target service call filter module 175.

Figure 2A:
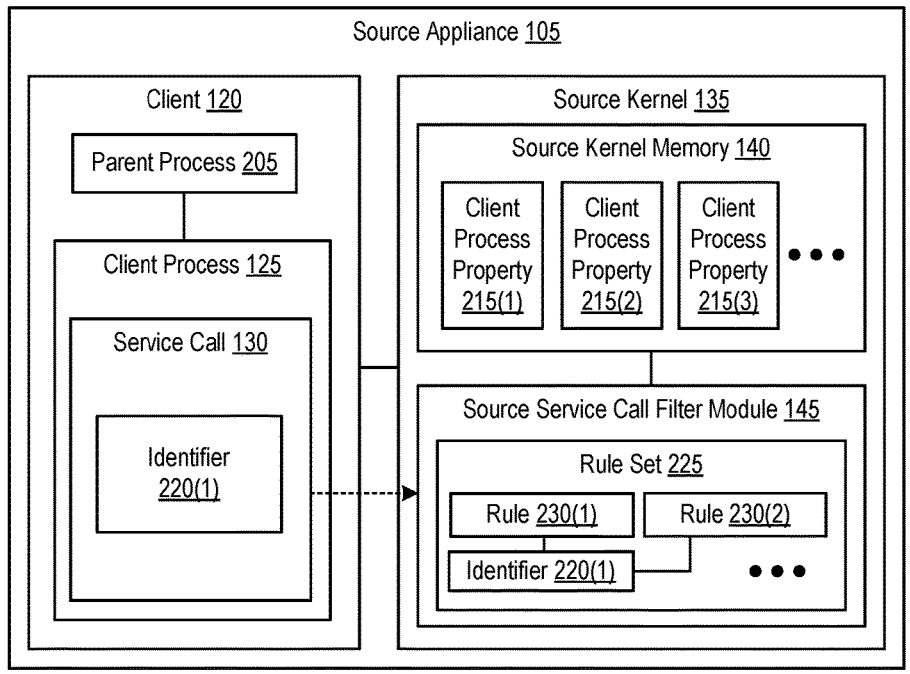
FIG. 2A is a block diagram of a source appliance, according to one embodiment of the present disclosure.

FIG. 2A is a block diagram of a source appliance, according to one embodiment. Source appliance 105 executes client process 125. In one embodiment, service call 130 includes an identifier 220(1). Identifier 220(1) identifies an internal service. In this example, service call 130 is a connection request from client 120 to server 180 requesting one or more internal services from server 180. Source kernel 135 is part of a source OS that executes on source appliance 105. Source kernel 135 manages input/output (I/O) requests from software (e.g., a data request, a data reply, and the like from client 120 and/or server 180) and translates the I/O requests into data processing instructions (e.g., for a central processing unit (CPU) or other computing components of source appliance 105). Source kernel 135 includes source kernel memory 140 and source service call filter module 145. Source kernel memory 135 stores client process properties 215(1)-(N). Source service call filter module 145 includes a rule set 225. Rule set 225 includes one or more rules as well as identifiers that correspond to those rules.

Client process properties 215(1)-(N) are properties (or details) associated with client process 125. In one embodiment, client process properties 215(1)-(N) include but are not limited to: (1) client program name (e.g., a client program name that executes client process 125), (2) parent process name (e.g., a parent process that executes client process 125), (3) user or user group context associated with client process 125, (4) terminal type of the client process (e.g., terminal type from where the client program is executed), and (5) one or more of various other client process properties.

Source service call filter module 145 is also part of source kernel 135 and is a kernel component. Source service call filter module 145 includes a rule set 225. Rule set 225 includes one or more rules (e.g., rule 230(1)). Each internal service provided by one or more servers deployed on target appliance 150 corresponds to (and is identified by) a single (and unique) identifier (e.g., internal service 185(1) corresponds to identifier 220(1)). Each identifier also identifies one or more rules that must be fulfilled by a client process before client 120 is provided access to an internal service that corresponds to that identifier.

Figure 2B:
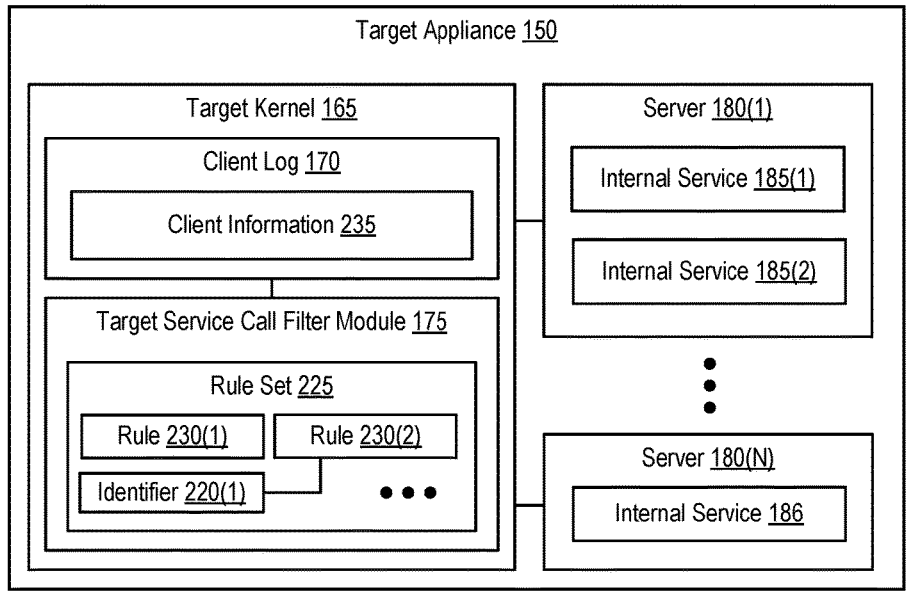
FIG. 2B is a block diagram of a target appliance, according to one embodiment of the present disclosure.

FIG. 2B is a block diagram of a target appliance, according to one embodiment. Target appliance 150 includes a target kernel 165 and deploys servers 180(1)-(N). Servers 180(1)-(N) can each provide one or more internal services to other appliances in the appliance ecosystem (e.g., to source appliance 105). Target kernel 165 includes a client log 170. Client log 170 stores client information 235. Client information 235 includes one or more client process properties (e.g., client process properties 215(1) and 215(2)) that are associated with client process 125. Target kernel 165 also includes target service call filter module 175. Like source service call filter module 145, target service call filter module 175 also stores rule set 225 (or a copy of rule set 225).

Identifier 220(1) corresponds to internal service 185(1). Therefore, access to internal service 185(1) requires a client process to meet or match all attributes specified in rule 230(1) or 230(2). In this example, identifier 220(1) is a port identifier and/or port number (e.g., each internal service has a unique port number). A port is an endpoint of communication in an OS.

In target appliance 150, a port identifier identifies a specific internal service. Once identified, a port identifier (e.g., an Internet socket port number) can be used to establish host-to-host connectivity (e.g., between client 120 and server 180). In other examples, identifier 220(1) can be any type of identifier (e.g., other than port numbers and/or port identifiers) that uniquely identifies an internal service.

Examples of Intercepting and Processing a Service Call in an Appliance Ecosystem In an appliance ecosystem, initiating service call 130 by client process 125 requires an Internet Protocol (IP) address and as well as a port number that the internal service binds to. For example, internal service 185(1) binds to identifier 220(1). The client process from client 120 to server 180 requires the creation of a socket call. Service call 130 can then be used to initiate the client process. In this example, service call 130 reaches internal services (or servers providing such internal services) executing on target appliance 150 via source kernel 135 and target kernel 165. The internal service accepts service call 130 and permits access to the resources provided by the internal service if certain conditions required by the internal service are met.

An internal service may not be able to verify client process properties associated with a client process (e.g., who initiated the service call, where the service call is coming from, and the like). Therefore, any client process in the appliance ecosystem can potentially initiate a service call. Consequently, in one embodiment, service call 130 specifies identifier 220(1) (e.g., a port number that corresponds to, identifies, and/or is related to a particular internal service provided by target appliance 150 as well as the IP address of the server that is providing the particular internal service).

Figure 2C:
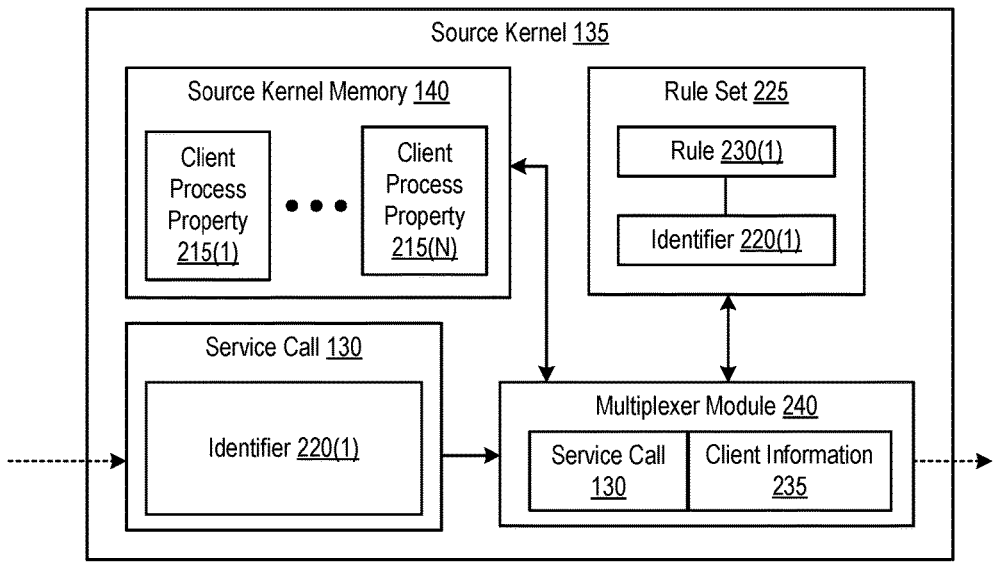
FIG. 2C is a block diagram of a source kernel, according to one embodiment of the present disclosure.

FIG. 2C is a block diagram of a source kernel, according to one embodiment. Rule set 225 is loaded into source kernel 135 and is accessible from source kernel 135 when source appliance 105 boots up. Source kernel 135 includes a multiplexer module 240. Source service call filter module 145 is multiplexer module 240. Multiplexer module 240 can be implemented separately from (and in addition to) source service call filter module 145.

In one embodiment, multiplexer module 240 intercepts service call 130 initiated by client process 125. In this example, service call 130 is a request for a particular internal service. The internal service is provided by server 180 implemented in target appliance 150. Multiplexer module 240 on source kernel 135 accesses rule 230(1) and determines whether the client process satisfies each (unique) attribute of at least one specified rule.

Figure 2D:
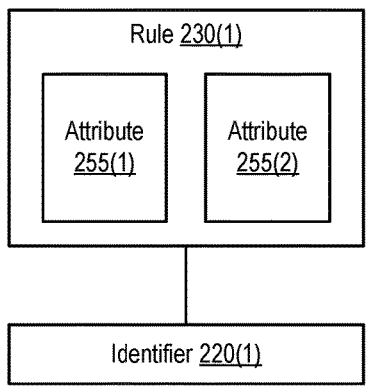
FIG. 2D is a block diagram of rule(s) specified for an internal service identified by an identifier, according to one embodiment of the present disclosure.

FIG. 2D is a block diagram of rule(s) specified and/or defined for an internal service identified by an identifier, according to one embodiment. Rule 230(1) specifies one or more attributes (e.g., attributes 255(1) and 255(2)) that must be met, fulfilled, and/or matched by the client process that initiates service 130. The internal service identified by (or that corresponds to) identifier 220(1) requires a client process to satisfy the attributes of rule 230(1). If the client process properties of client process 125 meet, fulfill, and/or match attributes 255(1) and 255(2), then multiplexer module 240 creates a service packet (e.g., service packet 245) by multiplexing (inserting) the client process properties of the client process (retrieved from kernel memory 140) as well as information in service call 130 (e.g., a port identifier and, optionally, an IP address). Multiplexer module then forwards service packet 245 to target appliance 150.

Figure 2E:
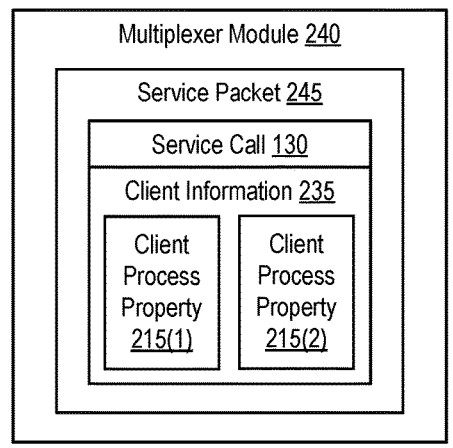
FIG. 2E is a block diagram of a multiplexer module, according to one embodiment of the present disclosure.

FIG. 2E is a block diagram of a multiplexer module, according to one embodiment. As previously noted, if the identifier specified in the service call identifies an internal service for which one or more rules are specified and/or defined in rule set 225, multiplexer module 240 multiplexes the client process properties of the client process initiated by service call 130 (e.g., client process properties 215(1) and 215(2)) along with information in service call 130). Multiplexing the client process properties and the service call involves combining client information (e.g., client process properties retrieved from source kernel memory) and the information in the service call into a single packet (e.g., service packet 245). In this example, service packet 245 is a network packet transmitted over network 190.

Figure 2F:
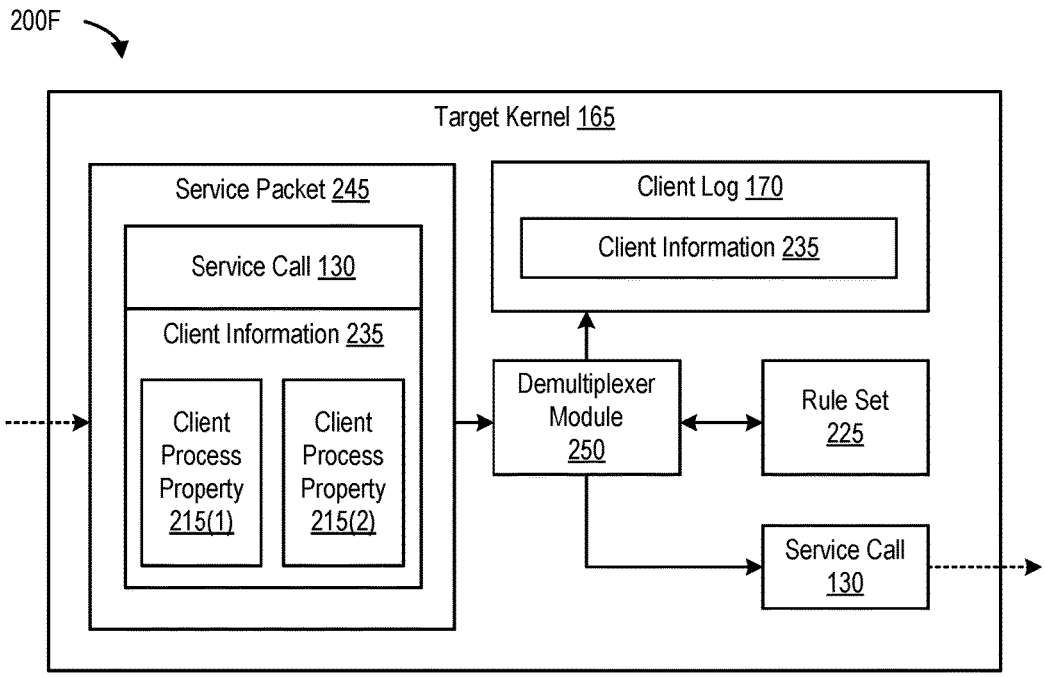
FIG. 2F is a block diagram of a target kernel, according to one embodiment of the present disclosure.

FIG. 2F is a block diagram of a target kernel, according to one embodiment. In certain embodiments, service call 130 forwarded to target appliance 150 as part of service packet 245 is intercepted by a demultiplexer module 250 implemented on target kernel 165 before the service packet arrives and is accepted by the internal service. Demultiplexer module 250 demultiplexes service packet 245 into service call information (e.g., identifier 220(1) that includes a port number, IP address, and any other information provided by the client in the service call) and client information (e.g., the client process properties associated with the client process and retrieved by multiplexer module 240). Demultiplexer module 250 then accesses rule 230(1) in rule set 225, and determines whether the corresponding client process properties that are part of service packet 245 meet, fulfill, and/or match each attribute of rule 230(1).

Figure 2G:
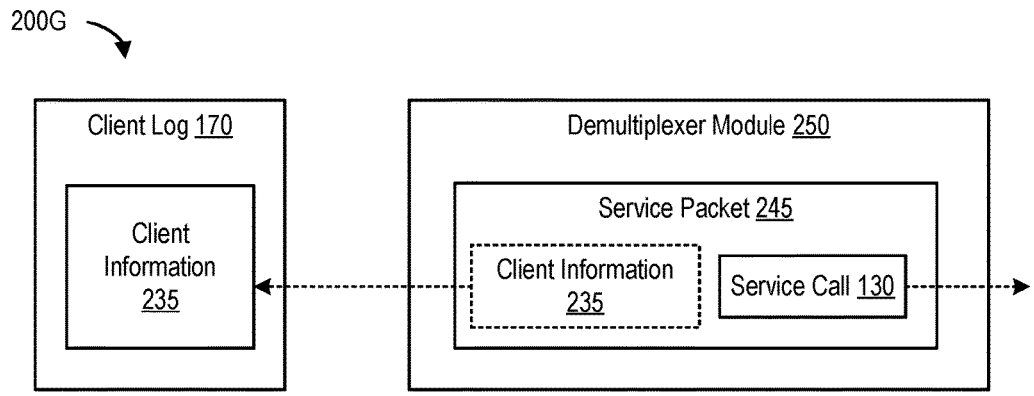
FIG. 2G is a block diagram of a demultiplexer module, according to one embodiment of the present disclosure.

FIG. 2G is a block diagram of a demultiplexer module, according to one embodiment. Demultiplexer module 250 determines whether the client process properties in the service packet are associated with a client process initiated by client 120 (e.g., a client that is in the same appliance ecosystem as server 180). If demultiplexer module 250 finds a match between the attributes of rule 230(1) and corresponding client process properties (received as part of client information in the service packet), demultiplexer module 250 determines that service call 130 is initiated by a legitimate client process in the appliance ecosystem.

Demultiplexer module 250 then removes (extracts) the client information from the service packet, and forwards the service packet to the target appliance with only information specified in service call 130. Demultiplexer module 250 saves the client information on client log 170 (e.g., for auditing purposes). However, if service call 130 requests an internal service for which one or more rules are specified and/or defined in the rule set, and no client information (e.g., one or more client process properties that match each attribute of the one or more rules specified and/or defined for the internal service identified by the identifier in the service call) is part of the service packet (received from the multiplexer module), demultiplexer module 250 rejects service call 130 and transmits an error notification to client 120.

Figure 3:
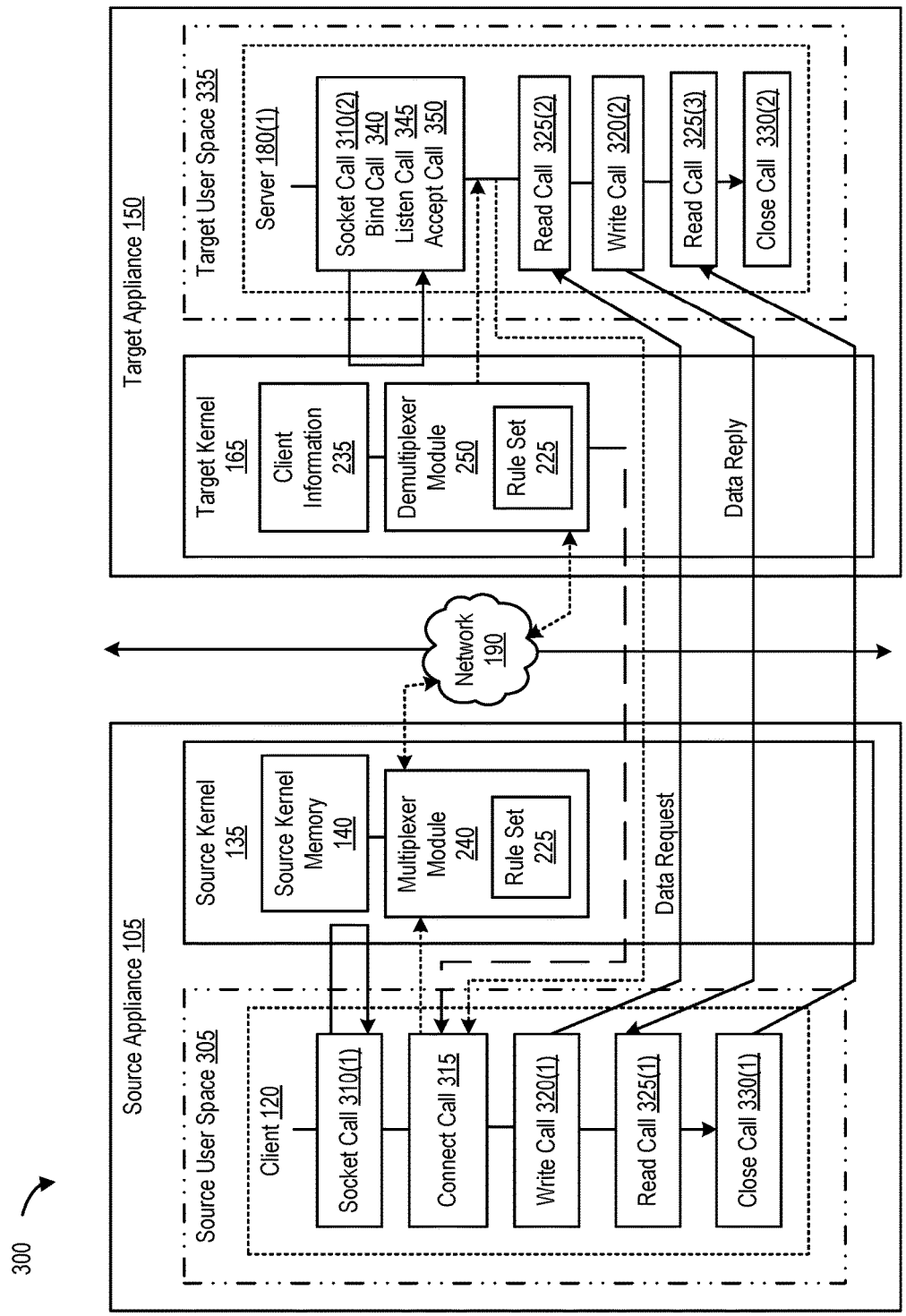
FIG. 3 is a block diagram of a source appliance and a target appliance communicatively coupled via a network, according to one embodiment of the present disclosure.

FIG. 3 is a block diagram of a source appliance and a target appliance, according to one embodiment. In one embodiment, and as shown in FIG. 3, the client process (e.g., client process 125) calls connect( )(e.g., using connect call 315) at the IP address of the internal service (e.g., IP address of server 180(1) which is specified in identifier 220(1))). Client 120 sends service call 130 to the internal service via source kernel. The multiplexer module reads the service call before the service call is forward to the target appliance.

In some embodiments, the multiplexer module (or the source service call filter module) retrieves the port number (and the server/IP address) of the internal service from the identifier specified in the service call. Multiplexer module then accesses a rule set to determine whether the rule set specifies and/or defines one or more rules for the port number (e.g., indicating that the internal service that corresponds to the port number is a protected internal service). If no rule is specified and/or defined for the port number, the multiplexer module forwards the service call to the target appliance (e.g., as-is).

However, if the rule set does specify at least one rule for the port number identified in the identifier, the multiplexer module accesses source kernel memory (of the source appliance) and retrieves one or more client process properties (e.g., client (process) details/information) from source kernel memory (e.g., user context, client program name, parent process, and the like). Multiplexer module (or source service call filter module) multiplexes the one or more client process properties associated with the client process and retrieved from source kernel memory as well as the information specified in the service call (e.g., the identifier) and generates a service packet. Multiplexer module then forwards the multiplexed service packet to the target appliance over a network.

Once forwarded, demultiplexer module (or target service call filter module) receives the service packet before the service packet reaches the internal service (or server). Demultiplexer determines whether the service call is a request for an internal service for which at least one rule is specified and/or defined in the rule set. If no rule is specified for the internal service identified by the service call, demultiplexer module simply lets the service call continue to the internal service (or server) (e.g., because the internal service is an unprotected internal service).

However, if at least one rule is specified in the rule set for the internal service identified in the service call, demultiplexer module determines whether the service packet includes client information (e.g., one or more client process properties applicable to the client process that initiates the service call). If no client information is available in the service packet, demultiplexer module rejects the service call and sends a reject notification to the client.

However, if the service packet includes client information (e.g., one or more client process properties), demultiplexer module demultiplexes the service packet to obtain the client process properties. Demultiplexer module then compares the each attribute of at least one rule to corresponding client process properties.

If each attribute of at least one rule that is specified and/or defined for the internal service matches a corresponding client process property, demultiplexer module removes the client information (e.g., client process details and/or client process properties) from the service packet, and forwards the service call (as part of the service packet) to the server. If no match is found, demultiplexer module rejects the service call.

Example Processes to Secure Internal Services in a Distributed Environment

Figure 4:
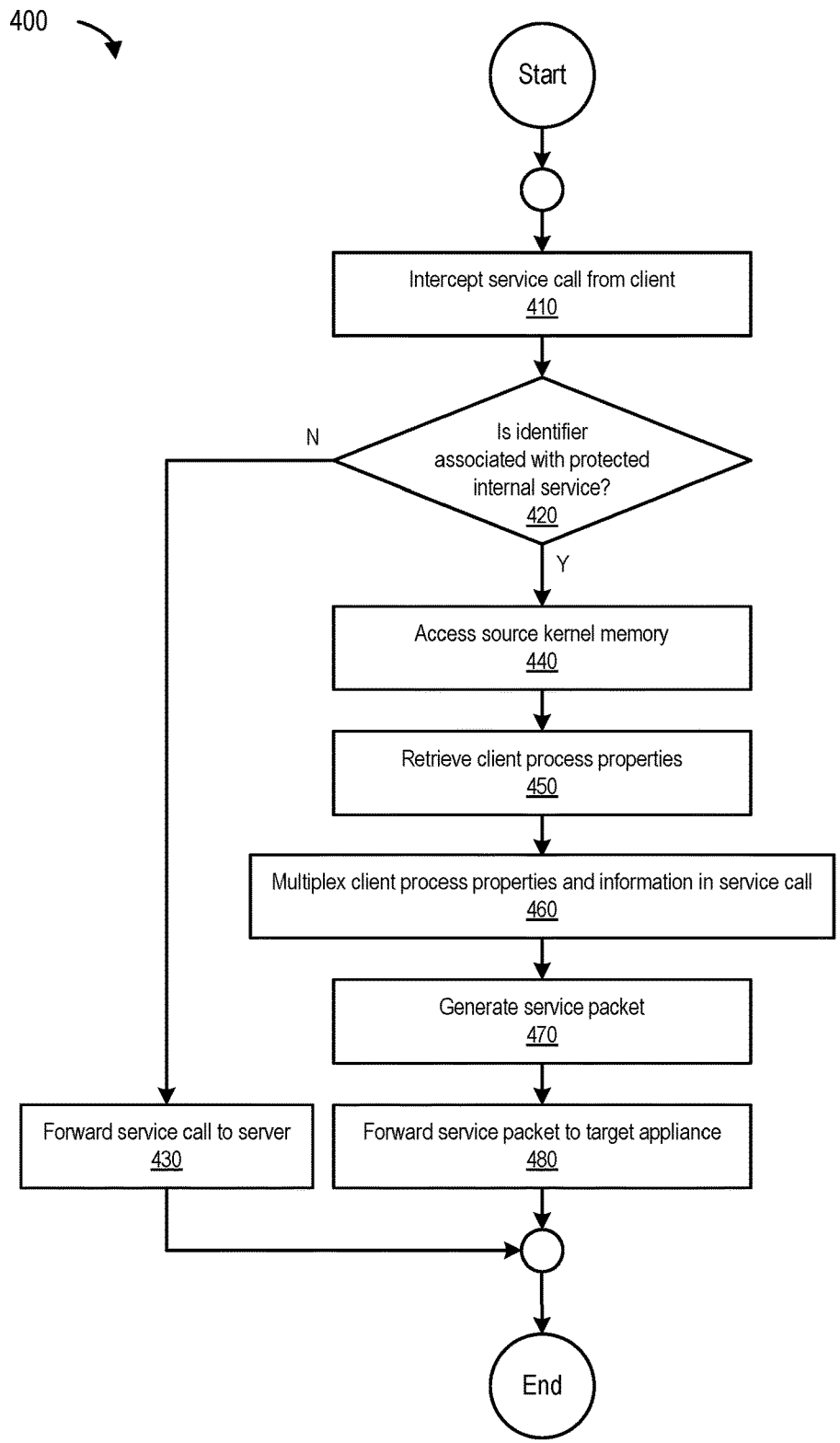
FIG. 4 is a flowchart that illustrates a process for forwarding a service packet to a server, according to one embodiment of the present disclosure.

FIG. 4 is a flowchart that illustrates a process for forwarding a service packet to a server, according to one embodiment. The process begins at 410 by intercepting a service call from a client. At 420, the process determines whether the identifier specified in the service call is associated with a protected internal service (e.g., whether at least one rule is specified and/or defined in a rule set for the internal service that corresponds to the identifier). If the internal service is unprotected (e.g., no rule is specified), the process ends at 430 by forwarding the service call to the server. However, if the internal service is protected, the process, at 440, access source kernel memory, and at 450, retrieves client process properties.

At 460, the process multiplexes the client process properties (e.g., client information) and the information in the service call (e.g., a port identifier, and a system address and/or IP address), and at 470 generates a service packet. In this example, the service packet is an update to a network packet that is sent by the service call and includes the identifier (e.g., service call information). The network packet is updated to generate the service packet by including the client information associated with the client process (e.g., user context, client program name, parent process name, terminal type, and the like). The process ends at 480 by forwarding the service packet to the target appliance.

Figure 5:
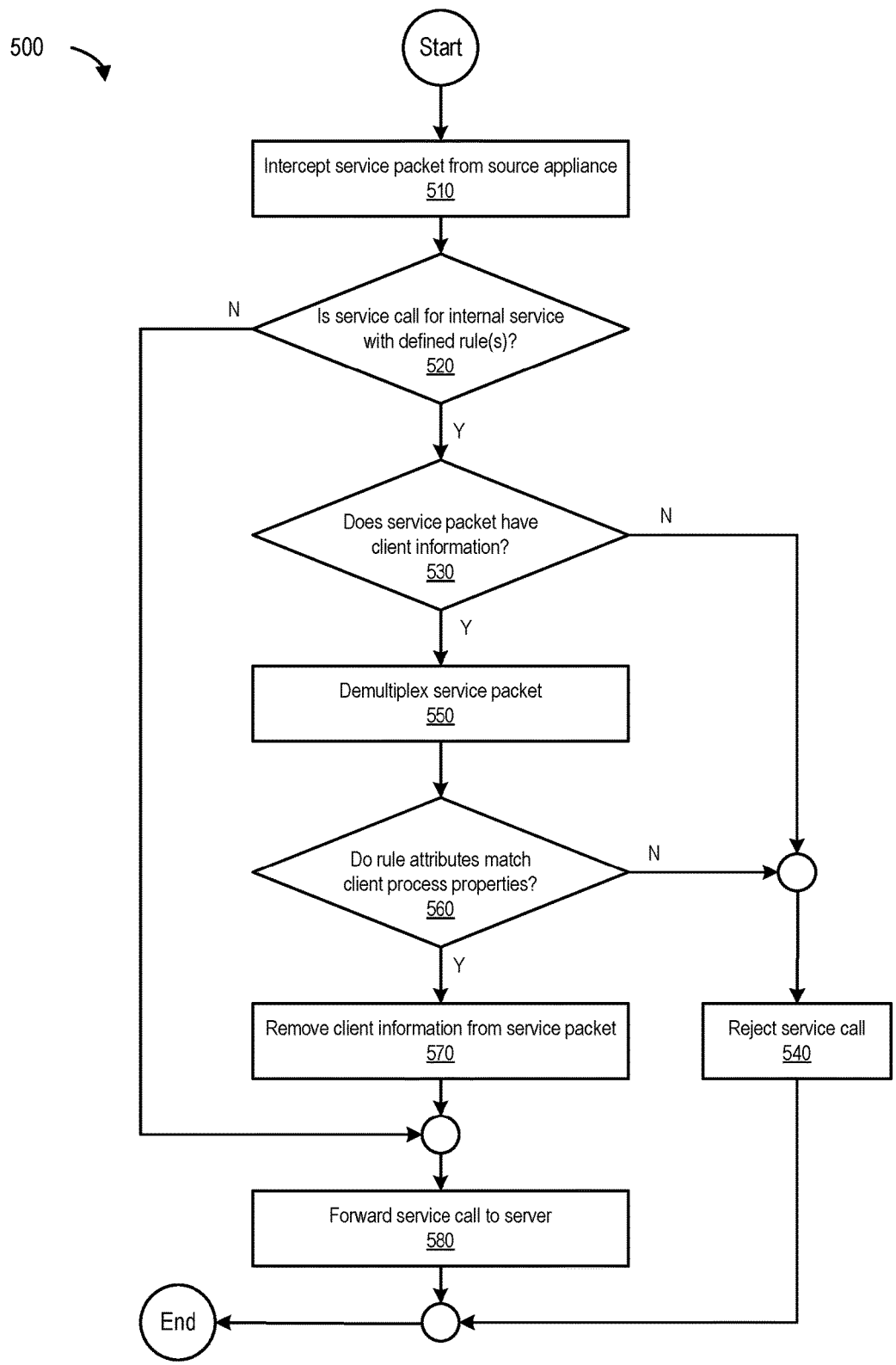
FIG. 5 is a flowchart that illustrates a process for processing rule attributes using client process properties, according to one embodiment of the present disclosure.

FIG. 5 is a flowchart that illustrates a process for processing rule attributes using client process properties, according to one embodiment. The process begins at 510 by intercepting the service packet (forwarded) from the source appliance (to the target appliance). At 520, the process determines whether the service call is for an internal service for which at least one rule is defined and/or specified in a rule set. If no rule is specified, the process ends at 580 by forwarding the service call (or service packet) to the server.

However, if at least one rule is specified for the internal service, the process, at 530, determines whether the service packet includes client information (e.g., one or more client process properties). If the service packet does not include client process properties, the process ends at 540 by rejecting the service call. However, if the service packet does include client process properties, the process, at 550, demultiplexes the service packet.

At 560, the process determines whether each attribute of at least one rule specified and/or defined for the internal service matches a corresponding client process property (of the client process properties included in and part of the service packet). If each attribute of none of the rule(s) match the corresponding client process property, the process ends at 540 by rejecting the service call. However, if each attribute of at least one rule matches the corresponding client process property, the process, at 570, removes the client information (e.g., the client process properties) from the (received) service packet, and ends at 580 by forwarding the service call to the server.

Other Embodiments

It should be noted that the client information (e.g., client information 235) is received by the target service call filter module (or demultiplexer module) by intercepting the multiplexed packet (e.g., the service packet) forwarded by the source service call filter module (or multiplexer module). The multiplexed packet (e.g., the service packet) contains the client information. The client information does not exist in the target kernel. The multiplexer module intercepts the connect( ) system call (e.g., connect call 315), and the demultiplexer module intercepts the accept( ) system call (e.g., accept call 350).

A client on another (non-appliance) system in the same network can also try to initiate a service call to an internal service on an appliance. In this case, the demultiplexer module will not receive the client properties as there is no multiplexer on the source system. Therefore, the demultiplexer module will reject the service call for the protected internal service.

An Example Computing Environment

Figure 6:
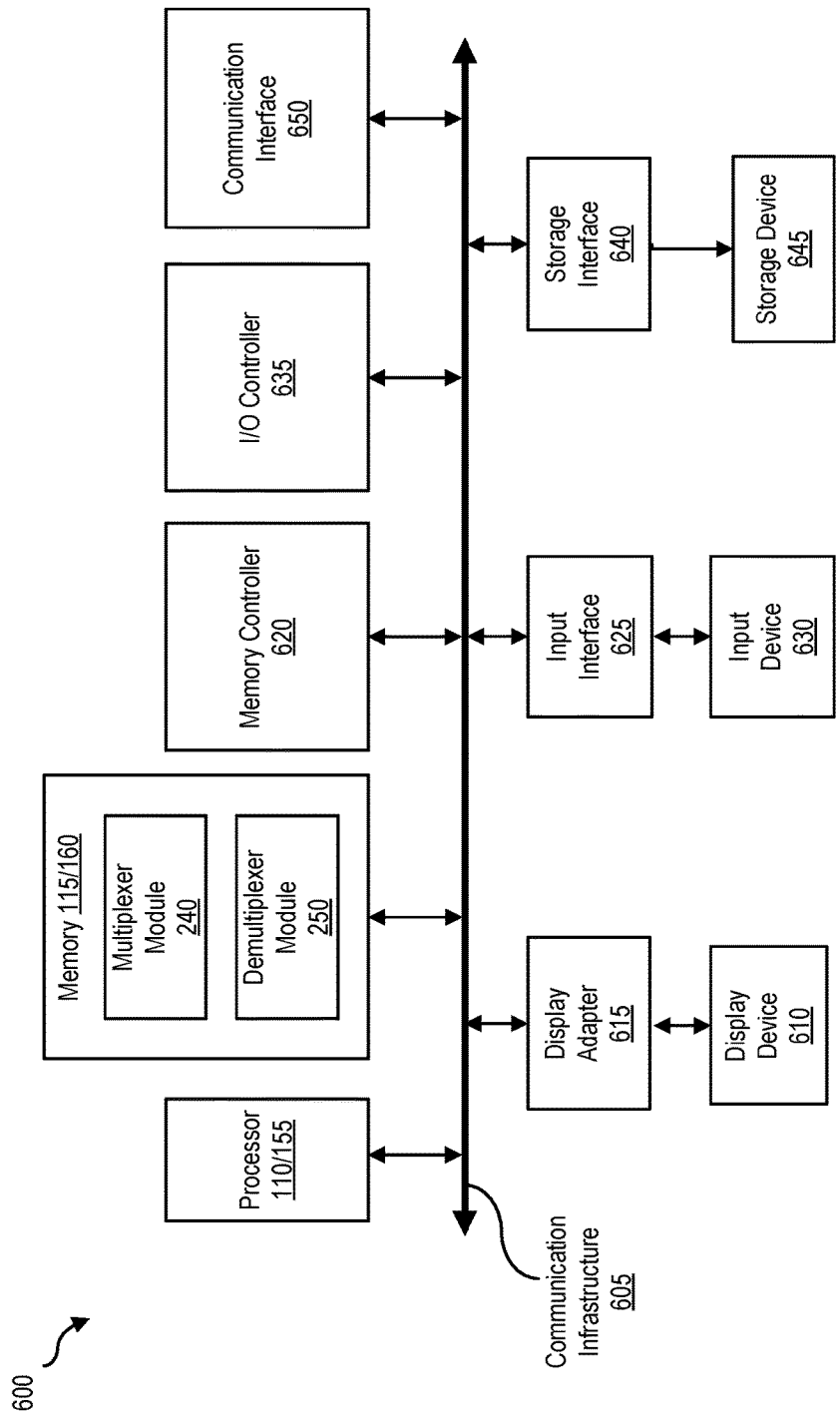
FIG. 6 is a block diagram of a computing system, illustrating how a multiplexer module can be implemented in software, according to one embodiment of the present disclosure.

FIG. 6 is a block diagram of a computing system, illustrating how a source service call filter module (multiplexer module) and/or a target service call filter module (demultiplexer module) can be implemented in software, in one embodiment. Computing system 600 represents any single or multi-processor computing device/system capable of executing computer-readable instructions and can include, without limitation, devices including workstations, personal computers, laptops, client-side terminals, servers, distributed computing systems, handheld devices, network appliances, storage controllers, and the like. Computing system 600 may include processor 110/155 and a memory 115/160. By executing the software that implements source appliance 105 and/or target appliance 150, computing system 600 becomes a computing device configured to secure internal services in a distributed (multi-appliance) environment.

Processor 110/155 generally represents any type or form of processing unit capable of processing data or interpreting and executing instructions. Processor 110/155 may receive instructions from a software application or module. These instructions may cause processor 110/155 to perform the functions of one or more of the embodiments described and/or illustrated herein. For example, processor 110/155 may perform and/or be a means for performing all or some of the operations, methods, or processes described and/or illustrated herein.

Memory 115/160 generally represents any type or form of volatile or non-volatile storage device or medium capable of storing data and/or other computer-readable instructions.

Examples include, without limitation, random access memory (RAM), read only memory (ROM), flash memory, and the like. Computing system 600 may include both a volatile memory unit and a non-volatile storage device. Program instructions implementing a multiplexer module and/or a demultiplexer module may be loaded into memory 115/160 respectively.

In certain embodiments, computing system 600 may also include one or more components or elements in addition to processors 110/155 and memory 115/160. For example, as illustrated in FIG. 6, computing system 600 may include a memory controller 620, an Input/Output (I/O) controller 635, and a communication interface 650, each of which may be interconnected via a communication infrastructure 605. Communication infrastructure 605 generally represents any type or form of infrastructure capable of facilitating communication between one or more components of a computing device. Examples of communication infrastructure 605 include, without limitation, a communication bus (e.g., Industry Standard Architecture (ISA), Peripheral Component Interconnect (PCI), PCI express (PCIe), or similar bus) and a network.

Memory controller 620 generally represents any type or form of device capable of handling memory or data or controlling communication between one or more components of computing system 600. For example, in certain embodiments memory controller 620 may control communication between processors 110/155, memory 115/160, and I/O controller 635 via communication infrastructure 605. In certain embodiments, memory controller 620 may perform and/or be a means for performing, either alone or in combination with other elements, one or more of the operations or features described and/or illustrated herein.

I/O controller 635 generally represents any type or form of module capable of coordinating and/or controlling the input and output functions of a computing device. For example, I/O controller 635 may control or facilitate transfer of data between one or more elements of computing system 600, such as processors 110/155, memory 115/160, communication interface 650, display adapter 615, input interface 625, and storage interface 640.

Communication interface 650 broadly represents any type or form of communication device or adapter capable of facilitating communication between computing system 600 and one or more additional devices. For example, in certain embodiments communication interface 650 may facilitate communication between the primary and secondary appliances and a private or public network including additional computing systems. Examples of communication interface 650 include, without limitation, a wired network interface (such as a network interface card), a wireless network interface (such as a wireless network interface card), a modem, and any other suitable interface. In at least one embodiment, communication interface 650 may provide a direct connection to a remote server via a direct link to a network, such as the Internet. Communication interface 650 may also indirectly provide such a connection through, for example, a local area network (such as an Ethernet network), a personal area network, a telephone or cable network, a cellular telephone connection, a satellite data connection, or any other suitable connection.

In some embodiments, communication interface 650 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 650 may also allow computing system 600 to engage in distributed or remote computing. Communication interface 650 may receive instructions from a remote device or send instructions to a remote device for execution.

Computing system 600 may also include at least one display device 610 coupled to communication infrastructure 605 via a display adapter 615. Display device 610 generally represents any type or form of device capable of visually displaying information forwarded by display adapter 615. Similarly, display adapter 615 generally represents any type or form of device configured to forward graphics, text, and other data from communication infrastructure 605 (or from a frame buffer, as known in the art) for display on display device 610.

Computing system 600 may also include at least one input device 630 coupled to communication infrastructure 605 via an input interface 625. Input device 630 generally represents any type or form of input device capable of providing input, either computer or human generated, to computing system 600. Examples of input device 630 include, without limitation, a keyboard, a pointing device, a speech recognition device, or any other input device.

Computing system 600 may also include storage device 645 coupled to communication infrastructure 605 via a storage interface 640. Storage device 645 generally represents any type or form of storage devices or mediums capable of storing data and/or other computer-readable instructions. For example, storage device 645 may include a magnetic disk drive (e.g., a so-called hard drive), a floppy disk drive, a magnetic tape drive, an optical disk drive, a flash drive, or the like. Storage interface 640 generally represents any type or form of interface or device for transferring and/or transmitting data between storage device 645, and other components of computing system 600. In certain embodiments, storage device 645 may be configured to read from and/or write to a removable storage unit configured to store computer software, data, or other computer-readable information. Examples of removable storage units include, without limitation, a floppy disk, a magnetic tape, an optical disk, a flash memory device, or the like. Storage device 645 may also include other similar structures or devices for allowing computer software, data, or other computer-readable instructions to be loaded into computing system 600 (e.g., to read and write software, data, or other computer-readable information). Storage device 645 may also be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from that shown in FIG. 6. Computing system 600 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 600 for storage in memory via a network such as the Internet or upon a carrier medium.

The computer-readable medium containing the computer program may be loaded into computing system 600. All or a portion of the computer program stored on the computer-readable medium may then be stored in memory 115/160 and/or storage device 645. When executed by processor 110/155, a computer program loaded into computing system 600 may cause processor 110/155 to perform and/or be a means for performing the functions of one or more of the embodiments described and/or illustrated herein. One or more of the embodiments described and/or illustrated herein may be implemented in firmware and/or hardware. For example, computing system 600 may be configured as an application specific integrated circuit (ASIC) adapted to implement one or more of the embodiments disclosed herein.

An Example Networking Environment

Figure 7:
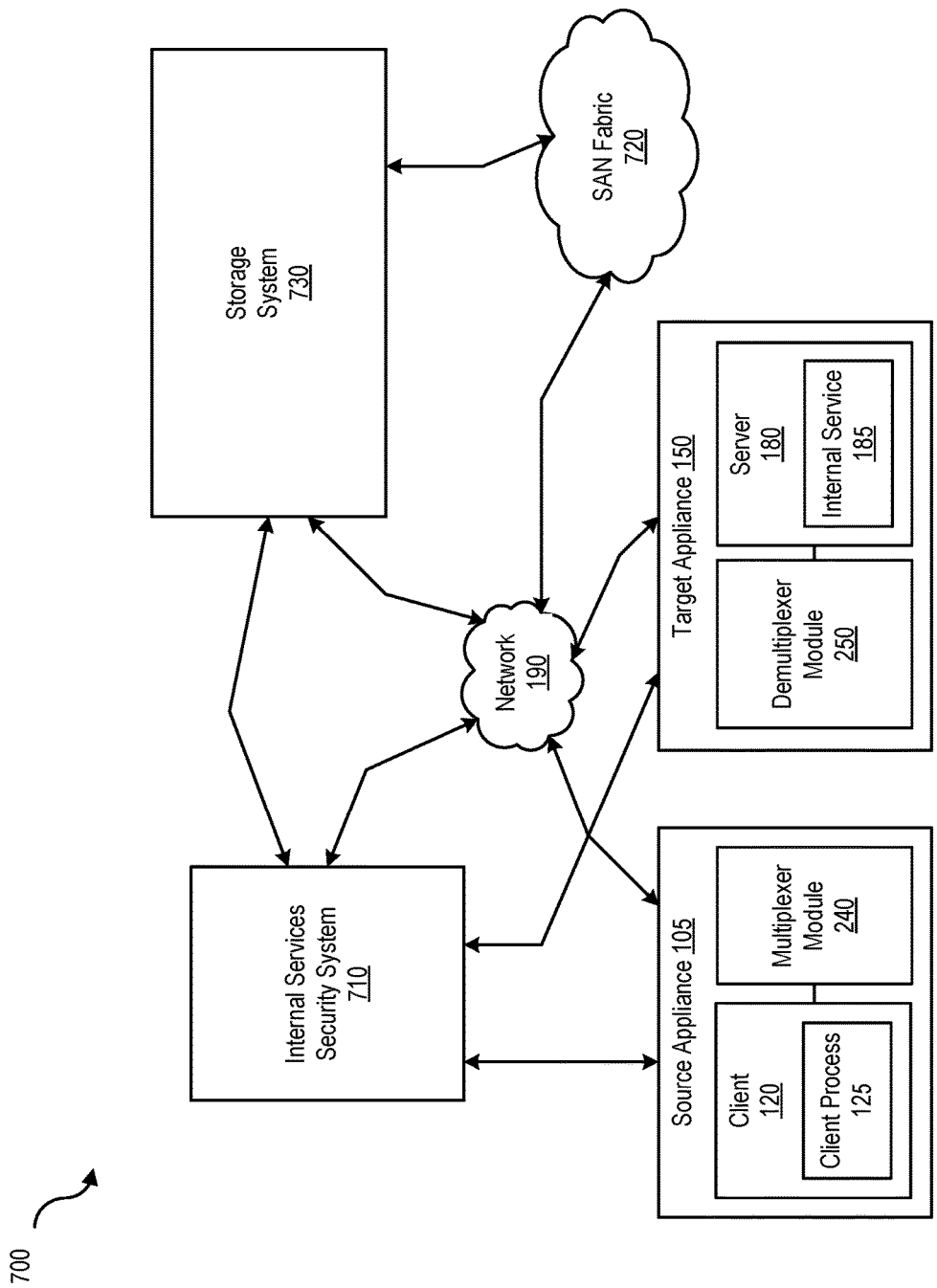
FIG. 7 is a block diagram of a networked system, illustrating how various devices can communicate via a network, according to one embodiment of the present disclosure.

FIG. 7 is a block diagram of a networked system, illustrating how various computing devices can communicate via a network, according to one embodiment. In certain embodiments, network-attached storage (NAS) devices may be configured to communicate with source appliance 105 and/or target appliance 150 using various protocols, such as Network File System (NFS), Server Message Block (SMB), or Common Internet File System (CIFS).

Network 190 generally represents any type or form of computer network or architecture capable of facilitating communication between multiple computing devices. Network 190 may facilitate communication between source appliance 105 and target appliance 150. In certain embodiments, a communication interface, such as communication interface 650 in FIG. 6, may be used to provide connectivity between source appliance 105 and/or target appliance 150, and network 190. It should be noted that the embodiments described and/or illustrated herein are not limited to the Internet or any particular network-based environment. For example, network 190 can be a Storage Area Network (SAN). In at least one embodiment, all or a portion of one or more of the embodiments disclosed herein may be encoded as a computer program and loaded onto and executed by source appliance 105 and/or target appliance 150, or any combination thereof. In addition, all or a portion of one or more of the embodiments disclosed herein may also be encoded as a computer program, stored on source appliance 105 and/or target appliance 150, and distributed over network 190.

In some examples, all or a portion of the computing devices in FIGS. 1, 2A, 2B, 2C, 2D, 2E, 2F, 2G, and 3 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, source appliance 105 and/or target appliance 150 may transform behavior of a computing device, cluster, and/or server in order to cause the computing device, cluster, and/or server to secure internal services in a distributed (e.g., multi-appliance) environment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
    intercepting a service packet comprising a service call from a source appliance at a server;
    determining that the service call is for an internal service provided by the source appliance;
    determining that the service packet comprises client information with one or more client process properties;
    demultiplexing the service packet;
    determining that one or more rule attributes associated with the internal service match the one or more client process properties;
    removing the client information from the service packet; and
    forwarding the service call to the server.

2. The computer-implemented method of claim 1, wherein
    the client information is retrieved from source kernel memory of the source appliance.

3. The computer-implemented method of claim 2, wherein
    the one or more client process properties comprise a user context, a user group context, a client program name, a parent process name, or a terminal type.

4. The computer-implemented method of claim 1, wherein
    determining that the service packet comprises the client information with the one or more client process properties comprises determining whether at least one rule of one or more rules for the internal service is defined or specified in a rule set.

5. The computer-implemented method of claim 4, wherein
    each rule of the one or more rules comprises the one or more rule attributes, and
    each rule attribute of the one or more rule attributes corresponds to a client process property of the one or more client process properties.

6. The computer-implemented method of claim 1, wherein
    the service call comprises an identifier, and
    the identifier identifies the internal service.

7. The computer-implemented method of claim 4, wherein
    the internal service is protected if the rule set comprises at least one rule of the one or more rules for an identifier specified in the service call, and
    the internal service is unprotected if the rule set does not comprise at least one rule of the one or more rules for the identifier specified in the service call.

8. A non-transitory computer readable storage medium storing program instructions executable to:
    intercept a service packet comprising a service call from a source appliance at a server;

determine that the service call is for an internal service provided by the source appliance;
determine that the service packet comprises client information with one or more client process properties;
demultiplex the service packet;
determine that one or more rule attributes associated with the internal service match the one or more client process properties;
remove the client information from the service packet; and
forward the service call to the server.

9. The non-transitory computer readable storage medium of claim 8, wherein the client information is retrieved from source kernel memory of the source appliance.

10. The non-transitory computer readable storage medium of claim 8, wherein
the one or more client process properties comprise a user context, a user group context, a client program name, a parent process name, or a terminal type.

11. The non-transitory computer readable storage medium of claim 8, wherein
determining that the service packet comprises the client information with the one or more client process properties comprises determining whether at least one rule of one or more rules for the internal service is defined or specified in a rule set.

12. The non-transitory computer readable storage medium of claim 11, wherein
each rule of the one or more rules comprises the one or more rule attributes, and
each rule attribute of the one or more rule attributes corresponds to a client process property of the one or more client process properties.

13. The non-transitory computer readable storage medium of claim 8, wherein
the service call comprises an identifier, and
the identifier identifies the internal service.

14. The non-transitory computer readable storage medium of claim 11, wherein
the internal service is protected if the rule set comprises at least one rule of the one or more rules for an identifier specified in the service call, and
the internal service is unprotected if the rule set does not comprise at least one rule of the one or more rules for the identifier specified in the service call.

15. A system comprising:
one or more processors; and
a memory coupled to the one or more processors, wherein the memory stores program instructions executable by the one or more processors to:
intercept a service packet comprising a service call from a source appliance at a server;
determine that the service call is for an internal service provided by the source appliance;
determine that the service packet comprises client information with one or more client process properties;
demultiplex the service packet;
determine that one or more rule attributes associated with the internal service match the one or more client process properties;
remove the client information from the service packet; and
forward the service call to the server.

16. The system of claim 15, wherein
the client information is retrieved from source kernel memory of the source appliance, and
the one or more client process properties comprise a user context, a user group context, a client program name, a parent process name, or a terminal type.

17. The system of claim 15, wherein
determining that the service packet comprises the client information with the one or more client process properties comprises determining whether at least one rule of one or more rules for the internal service is defined or specified in a rule set.

18. The system of claim 17, wherein
each rule of the one or more rules comprises the one or more rule attributes, and
each rule attribute of the one or more rule attributes corresponds to a client process property of the one or more client process properties.

19. The system of claim 15, wherein
the service call comprises an identifier, and
the identifier identifies the internal service.

20. The system of claim 17, wherein
the internal service is protected if the rule set comprises at least one rule of the one or more rules for an identifier specified in the service call, and
the internal service is unprotected if the rule set does not comprise at least one rule of the one or more rules for the identifier specified in the service call.

* * * * *